(12) United States Patent
Clements

(10) Patent No.: US 9,383,914 B2
(45) Date of Patent: Jul. 5, 2016

(54) TOUCH FREE USER RECOGNITION ASSEMBLY FOR ACTIVATING A USER'S SMART TOILET'S DEVICES

(71) Applicant: Sigmund Lindsay Clements, Montreal (CA)

(72) Inventor: Sigmund Lindsay Clements, Montreal (CA)

( * ) Notice: Subject to any disclaimer, the term of this patent is extended or adjusted under 35 U.S.C. 154(b) by 385 days.

(21) Appl. No.: 13/928,378

(22) Filed: Jun. 27, 2013

(65) Prior Publication Data
US 2015/0000026 A1    Jan. 1, 2015

(51) Int. Cl.
*G06K 9/00* (2006.01)
*E03D 9/08* (2006.01)
*G06F 3/0488* (2013.01)
*G06F 3/0482* (2013.01)
*G06F 3/041* (2006.01)
*G06F 3/01* (2006.01)
*G06F 3/03* (2006.01)
*E03C 1/05* (2006.01)

(52) U.S. Cl.
CPC .............. *G06F 3/0488* (2013.01); *E03C 1/057* (2013.01); *E03D 9/08* (2013.01); *G06F 3/013* (2013.01); *G06F 3/017* (2013.01); *G06F 3/0304* (2013.01); *G06F 3/041* (2013.01); *G06F 3/0482* (2013.01); *G06F 3/04886* (2013.01); *G06K 9/00268* (2013.01); *G06F 2203/04108* (2013.01)

(58) Field of Classification Search
None
See application file for complete search history.

(56) References Cited

U.S. PATENT DOCUMENTS

| | | | |
|---|---|---|---|
| 5,201,080 A * | 4/1993 | Tanaka | E03D 9/08 4/443 |
| 5,828,044 A | 10/1998 | Jun | |
| 6,317,717 B1 | 11/2001 | Lindsey | |
| 7,483,964 B1 * | 1/2009 | Jackson | H04L 12/2809 455/41.1 |
| 2,033,187 A1 | 3/2009 | Chang | |
| 7,636,956 B1 | 12/2009 | Doucet | |
| 8,064,647 B2 | 11/2011 | Au | |
| 2,595,067 A1 | 5/2013 | Castrec | |

(Continued)

FOREIGN PATENT DOCUMENTS

| | | |
|---|---|---|
| CA | 2772957 A1 | 9/2013 |
| CA | 2776856 A1 | 11/2013 |

(Continued)

OTHER PUBLICATIONS

Bruce Sterling, Augmented Reality: Intel Perceptual Computing top ten resources for developers, Wired Magazine web site, Jan. 10, 2013, pp. 1-2, Conde Nast, San Francisco, California, USA.

(Continued)

*Primary Examiner* — David F Dunphy

(57) ABSTRACT

The system may use a touch free device to identify a user. The system allows the user to operate a smart toilet's devices with the passive input of their presence, in the toilet area. The user may be identified using, facial recognition, eye recognition, or proximity card devices. The computer associates the identified user with the user's pre stored identity and preprogrammed user profile. The user's profile may contain the user's desired smart toilet device settings. Toilet devices settings and sequence of operation may include a bidet's water temperature, a toilet seat position, an internet connection to the computer, etc. Operating the toilet touch freely, reduces the user's physical contact with the toilet control panel and toilet seat. This may reduce the transference of bacteria from the toilet to the user. This may reduce the possibly of illness caused by bacteria. Other embodiments are described and shown.

20 Claims, 9 Drawing Sheets

(56) References Cited

U.S. PATENT DOCUMENTS

| | | | |
|---|---|---|---|
| 8,452,131 B2 | 5/2013 | Connell | |
| 2002/0007510 A1* | 1/2002 | Mann | E03C 1/057 4/300 |
| 2005/0029353 A1 | 2/2005 | Isemura | |
| 2009/0174662 A1* | 7/2009 | Kato | G06F 3/03543 345/163 |
| 2010/0141397 A1* | 6/2010 | Kim | G08B 21/0423 340/10.5 |
| 2012/0234409 A1* | 9/2012 | Klicpera | B05B 12/004 137/551 |
| 2013/0180041 A1 | 7/2013 | Ding | |

FOREIGN PATENT DOCUMENTS

| | | |
|---|---|---|
| CA | 2778201 A1 | 11/2013 |
| CN | 201202168 Y | 3/2009 |

OTHER PUBLICATIONS

Anonymous Authors, Japan Toilets article, sub article Advanced Features, Wikipedia web site, no date of publication, San Francisco, California, USA.

Jason Gilbert, Satis Bluetooth Toilet: Japan's Lixil Creates a Commode That Can Be Totally Controlled Via Smartphone, Huffington Post web site, Dec. 18, 2012, New York, New York, USA.

Anonymous Author, Intel Audience Impression Metric Suite, sub article Empowering digital signage with audience detection and analytics, no date, pp. 1-2, Intel Audience Impression Metric Suite web site, Intel corporation, Santa Clara, California, USA.

Michelle Starr, Fill'er up—and pay using facial recognition, CNET web site , Jul. 24, 2013, p. 1, CBS Interactive, San Francisco, California, USA.

Sam Grobart, Bells and Whistles Descend Upon the Throne, New York Times, Oct. 12, 2011, pp. 1-2, New York Times, New York, New York, USA.

Shan Li and David Sarno, Advertisers start using facial recognition to tailor pitches, Los Angeles Times, Aug. 21, 2011, p. 1, Los Angeles Times, Los Angeles , California, USA.

Alicia Ciccone, High tech Toilet Takes Urine Sample, Provides Health Report, Huffington Post web site, May 7, 2012,1 page, New York, New York, USA.

Chris Matyszczyk, Sega Toylet games aim to please, cnet web site, Jan. 11, 2011, p. 1, CBS Interactive, San Francisco, California, USA.

\* cited by examiner

TOUCH FREE USER RECOGNITION ASSEMBLY FOR ACTIVATING A USER'S SMART TOILET'S DEVICES

CROSS REFERENCE TO RELATED APPLICATIONS

This application claims the benefit of provisional patent application Ser. No. 61/664,747 filed Jun. 26, 2012, provisional patent application Ser. No. 61/739,727, filed Dec. 20, 2012, provisional patent application Ser. No. 61/757,094 filed Jan. 27, 2013, provisional patent application Ser. No. 61/818,027, filed May, 1, 2013.

FEDERALLY SPONSORED

Not Applicable

SEQUENCE LISTING

None

BACKGROUND FIELD OF THE EMBODIMENTS

This application relates to the technical field, of a smart toilet's user's profile being activated. The users profile may comprise the toilet devices setting, and the toilet devices sequence of operation. The profile is activated by activating a user profile button, on a toilet menu control panel. More specifically to an improved way to activate the toilet menu profiles buttons, without physically contacting the profile's activating buttons.

Toilet control panel device function activation buttons can become contaminated by germs, during user hand contact with the control buttons. The bacteria can travel from the panel buttons, and be transmitted to a person's hands, Hands may then spread the bacteria and viruses to the person's mouth, to other surfaces, to other people, and to food, thereby increasing the risk of food poisoning, and transfer of diseases. Many people don't like to touch buttons, that have bacteria on them. Toilet remote control touch buttons, and touch display faces have the problem of accumulating germs.

Some people try to wrap toilet paper around their hand, before touching the control panel buttons, in an effort to try to put an antibacterial barrier between the buttons and their hand. The toilet paper barrier is ineffective since bacteria can easily travel through toilet paper. People may try to use a piece of clothing, such as a part of a shirt sleeve as a barrier between the button and the hand. The shirt sleeve may act as a barrier; thought bacteria can attach to the user's shirt sleeve. Disposable rubber gloves may be effective in using the buttons sanitarily, though people may not like to carry and use rubber gloves.

To raise or lower the toilet seat, some people try to use their foot or shoe; this has drawbacks, such as the possibility of losing one's balance and falling. It also requires a certain amount of skill, to stand on one leg, and use the other leg to position the seat.

Some toilet remote controls that use a user profile, include a Satis toilet remote control touch screen display that is made by the Lixil toilet company of Tokyo, Japan, a Kohler Numi toilet remote control touch screen display made by the Kohler Company of Kohler, Wis., or a Toto smart toilet remote control touch screen display made by Toto Company of Tokyo, Japan. The screen needs to be touched to activate the profile. The screen may have bacteria on it that can be transferred to a user when they touch the screen.

Several Satis toilets made by the Lixil Corporation of Tokyo, Japan, use a smart phone blue tooth connection to Satis smart toilet, a touch screen display is used to activate a user's toilet device operation profile. Smart phone toilet icon buttons are used to change the user's profile. Physical touch is needed to activate the buttons. Thought a person could have their own private cell phone, the user still has to physically touch the buttons. The touching of the buttons may be a path way for bacterial transmission. Active input is needed by the user; passive user input won't operate the system.

Wireless Bluetooth remote control, liquid crystal display panel are used to influence a toilet devices functions, such as, a toilet remote control touch screen display and toilet made by the Kohler Company. The Brondell Company of San Francisco, Calif., uses a hand held remote control which uses an infrared connection to a smart toilet seat, to control the toilet seats functions. The screen needs to be touched to activate the user's profile. The screen may have bacteria on it that can be, transferred to a user when they touch the screen.

An input device such as a pencil could be used to active the touch screen displayed profile, thought the user would still have to touch the pencil which may, have bacteria on its surface.

Defects of other devices, is that, active input is needed by the user, passive user input won't operate the system. Physical movement is required near a sensor to operate them; simple user presence won't operate the toilet devices. Using touch to active a user profile, may allow bacteria to be transferred, to a user's hand, from the touched surface.

Many of the touch panel toilet device function buttons heretofore known suffer from a number of disadvantages:

(a) Bacteria can be transferred from the menu buttons, to the user's hands when they touch the button to activate the menu option associated with the button.

(b) It may be difficult for the user to access the area, where the control panel is located, in order to touch the panel's buttons.

(c) Physically challenged users may have a difficulty touching, the control panel buttons.

(d) It may be difficult to clean and remove bacteria from mechanical buttons, the buttons may be difficult to clean and bacteria may build up on the buttons.

Some advantages of touch free user profile toilet activation, are bacteria and viruses, are unable to be transmitted to the user's hands, from the control panel. By limiting hand contact, with the bacteria and viruses that are on the panel, flushing handle, seat and lid, the transmission of bacteria and viruses to the hands, is substantially reduced. The touch free toilet assembly lowers the amount of bacteria that is transmitted from the toilet to hands, which lowers the amount of bacteria that is transmitted to the user, by hand to mouth transmission. By lowering the quantity of bacteria on the user's hands, the amount of bacteria traveling from hands to food is lowered. Touch free interaction limits the bacteria on hands, which limits the amount of bacterial transmitted from hands to surfaces, and from hands to other people. Lowering the cross contamination of bacteria and viruses, from the control panel and toilet seat to the user's hands, lessens peoples exposure to food poisoning, and disease pathogens.

Service sectors that are highly concerned about hygiene, such as the food industry, restaurants, medical industry, hospitals, health works, may be interested in hands free toilet panels and toilet seats. Combining hands free toil seats, with washlet bidets that use water to clean a user's bottom, a warm air dryer to dry the user's bottom, greatly reduces the need to use toilet paper, which may reduce the amount of bacteria, the user to may be in contact with.

Signs asking employees to wash their hand after going to the toilet, may be less pressing, since workers contact with control panel, seat, and flushing handle would be greatly reduced. Progress in toilet panel cleanliness increases people's psychical wellbeing, and mental wellbeing, by having a safer bathroom environment. Decreasing sickness caused by bacterial, contamination increases productivity, and work space contentment. Physically challenged users can access the toilet, without having to touch the buttons.

There are many ways to touch freely interact with the touch free user profile activation assembly, for example using, facial recognition, user eye recognition, wireless proximity card user identification, or a combination of the different user identifying devices, used together.

The user's profile activation, can operate toilet devices, such as, a lid positioning motor, a seat positioning motor, a heated seat, a bottom air dryer blower, a bidet front wash, a bidet back wash, a toilet flush device, a bidet wand forward and backward mover, a seat massager, an air purifier, a stop button, an internet connection, a music player, etc.

Advantages

The advantages of the touch free toilet control panel, include, without limitation, are an improved touch free toilet control panel. From the ensuing description, a number of advantages of some of the embodiments, of the touch free toilet control display become evident.

(a) The user only needs to let the system identify them to operate the various toilet devices; no other input is needed from the user.

(b) Bacteria or viruses aren't transferred to the user, by the user's identity touch freely activating the toilet devices.

(c) The touch free user profile allows for easy activation the of toilet devices, for medically or mobility challenged users.

(d) Touch free user profile activation, may aid disabled users.

(e) The touch free user profile system may be more versatile, user friendly, simpler and easier to use, then other systems.

(f) The toilet seat assembly reduces the need to bend over, to position the seat, which may be helpful for disabled or elderly users.

(f) Touch free user profile activation may lower interpersonal relationship tension, between users. To avoid touching the seat, users may ask other users to lower the seat after use. Being able to position the seat and lid, using non touch user profiles, removes the need for users to communicate their desired seat position to each other, thus reducing friction between users, and possibly creating a more harmonious environment.

Accordingly several advantages are to provide an improved hands free toilet control panel, as a means of providing a more sanitary, fun, and healthy experience, for a person. Still further advantages will become apparent from a study of the following description and the accompanying drawings. Various embodiments of touch free user recognition, allow for a user to control the various toilet devices without touching the control panel display. The capabilities and functions of the touch free toilet user recognition system, bring the future of sanitary bathroom practices and advances, to the present now.

SUMMARY

In accordance with various embodiments, of the touch free user recognition assembly for activating a smart toilets devices, the assembly identifies a user touch freely, and activates toilet device settings, which are associated with the user. User identifying devices, are connected to a computer, the computer is connected to various toilet devices, and many of the toilet devices are attached to a toilet.

Various devices used to recognize a user, may use facial detection, eye recognition, and or user radio frequency identification cards, etc. The user's identification is associated, with their user profile, which is preprogrammed into the computer. The profile contains toilet device settings. The toilet device settings, may include, bidet water pressure, toilet seat temperature, radio station setting, etc. The user's toilet device settings profile, is activated when the user is touch freely identified.

The system may use an automatic bidet, which uses a camera, and gender recognition software, to detect a user's gender. The sensors and or camera, may be used to detect the user's body evacuation. The sensors and or camera, detect weather the user's evacuation, is from the user's bladder or bowel. The sensors and or camera, detect when the user starts and stops the evacuation process. Using the sensor and or camera information, the automatic bidet automatically washes the user's bottom. The user only needs the input of their presence, using the toilet, to operate the automatic bidet.

DRAWINGS FIGURES

DRAWINGS, REFERENCES NUMBERS

Figure 1:
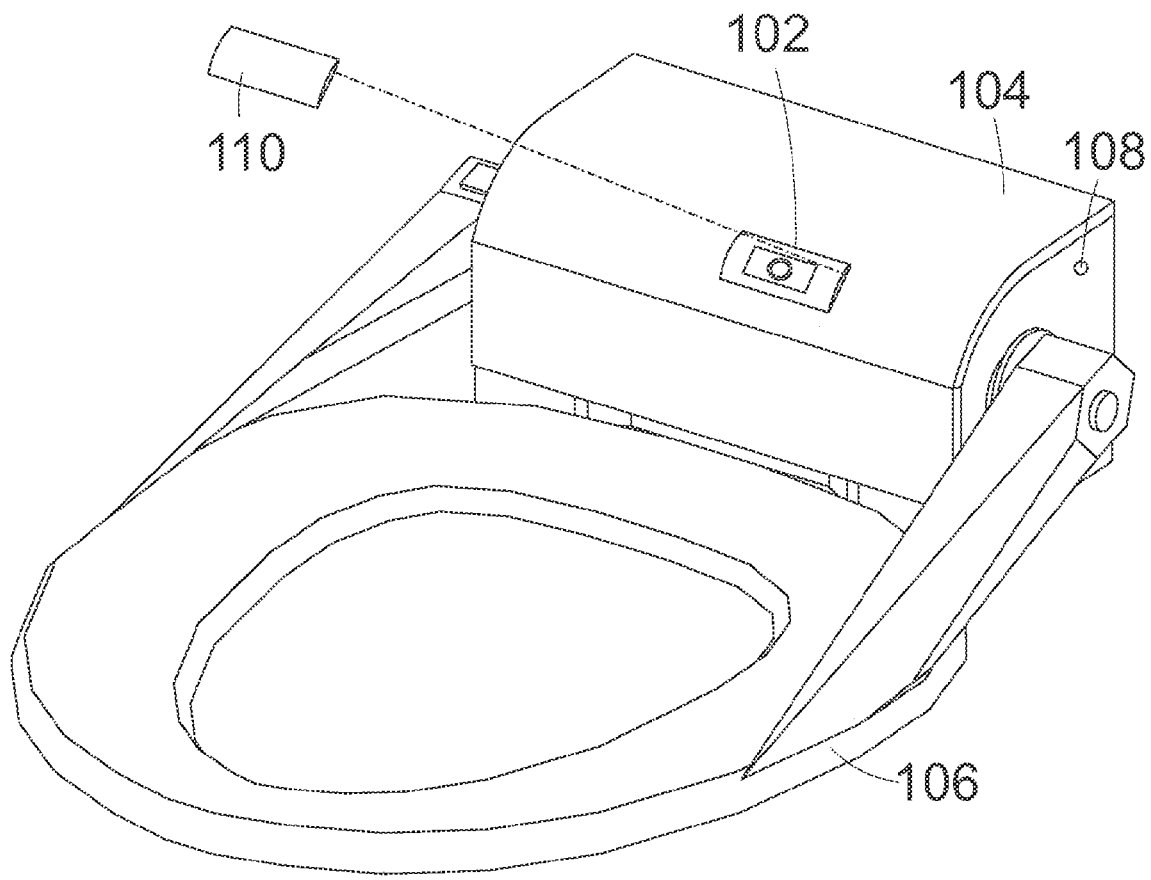
FIG. 1 is a top front right side perspective view, of a Luxand facial recognition and identifying device, in a motorised toilet seat assembly.
Figure 2:
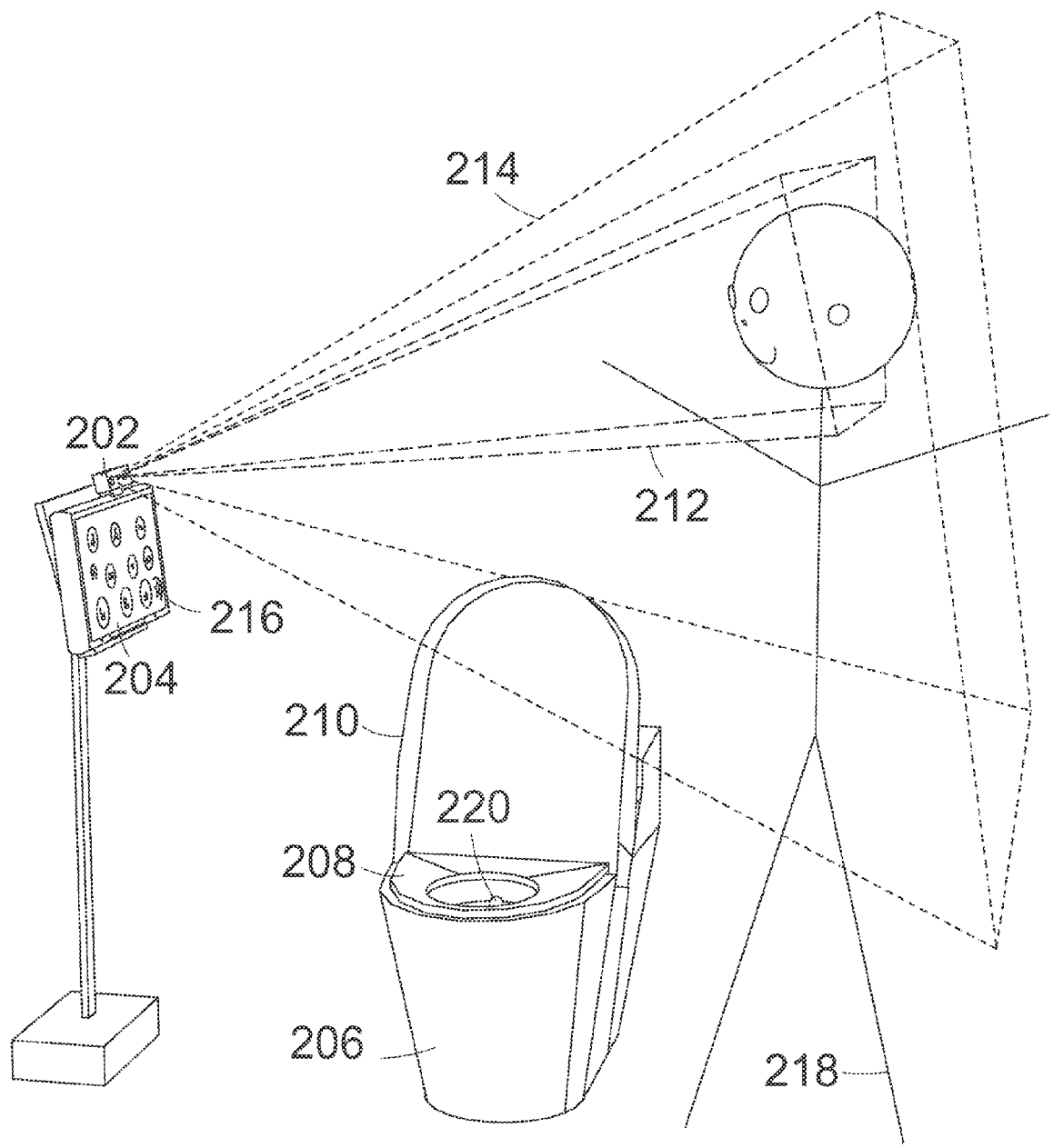
FIG. 2 is a front right side perspective view, of a Kinect sensor facial recognition and identifying device, a display and a smart toilet.

102 facial identifying camera Luxand
104 computer housing assemblage Luxand
106 toilet seat Luxand
108 computer reset button Luxand
110 transparent camera cover Luxand
202 Kinect sensor Kinect
204 computer display Kinect
206 smart toilet Kinect
208 toilet seat Kinect
210 lid Kinect
212 facial identifying zone Kinect
214 user computer input zone Kinect
215 internet connection to computer icon Kinect
216 computer Kinect 217 seat and lid down Kinect
218 user Kinect
220 bidet Kinect
223 user profile activation icon Kinect
224 bottom air dryer blower icon Kinect
225 microphone Kinect
226 bidet front wash activate icon Kinect
227 speaker Kinect
228 bidet back wash activate icon Kinect
244 cursor Kinect
246 circular line visual timer Kinect
302 Intel camera sensor Intel 304 computer Intel
306 facial identifying zone Kinect Intel
308 user computer input Intel
310 smart toilet Intel
312 toilet seat Intel
314 lid Intel
318 bidet Intel
320 display Intel
502 HID proximity card detector HID
504 computer with display HID
522 cell phone HID
508 proximity card detector wireless connection to proximity card HID
510 smart toilet HID
512 toilet seat HID
514 lid HID
516 user HID
518 bidet HID
520 proximity card wireless connection to proximity card detector HID
522 proximity card HID
602 computer Tobii
604 camera Tobii eye identifier Tobii
606 bidet wand icon Tobii
608 bidet wand Tobii
610 gaze point Tobii
612 user interaction zone Tobii
614 user eyes Tobii
618 display
620 smart toilet Tobii
622 internet connection to computer icon Tobii First Embodiment Description
Facial Recognition Description An embodiment, specification, uses a microcontroller 104 that is programmed with facial recognition software 104, which is made by the Luxand Company. The microprocessor 104 and a camera 102, are inside a housing 104. The microcontroller incorporates a microprocessor, central processing unit 104 with a speed of 1.66 megahertz. A video camera, video cam, web cam 102 connects to the microcontroller 104. The Luxand facial recognition software 104, is programmed using Luxand programming manuals. The camera 102 looks out of the front of the housing 104, which has an unobstructed view of the toilet area, whether the seat 602 is in the up or down position. The system is connected to a reset button 108, and can be reset by pushing the system reset button 108, FIG. 1. The facial recognition toilet seat assembly, is attached to a toilet (not shown). The housing 104 is attachable to a toilet (not shown).

The touch free user identity recognition device means, is the microcontroller 104 that is programmed with facial recognition software 104, and the camera 102.

Facial Recognition Operation

The assembly incorporates a facial recognition system 104. The system may use a computer or microcontroller 104, which are programmed with facial recognition software, as illustrated in FIG. 1. The facial recognition and speech recognition software enables the system to identify, recognize a user, and associate the user to their system favourites. The facial recognitions system visually identifies a user, and a user identification is created. When the user is identified, the system moves the seat 602 to a position, which is the users, usual desired position. The system can remember a user's preferences, from their initial use of the system. User preferences or settings may include seat 602 positions, sound effects or music, and desired seat 602 positions when vacating the assembly. The facial recognition software is based on the ability to recognize a face, and measure the various features on the face. Two dimensions, 2D, or three dimension, 3D, facial recognition software can be used, to identify a user. A video camera or a web cam 102, is positioned in the front of the housing 104. The camera 102 views through a transparent window 110, which permits an unobstructed view of a user, whether the seat 602 is up or down. The video cam 102 is connected to the microcontroller, and supplies images of the user, to the facial recognition software programmed in the microcontroller. A user only needs to be within view of the video cam 102 to activate the facial recognition software. The distance at which, the facial recognition software activates the system, and moves the seat 602 to the user's usual positions, is adjustable by the user.

Additional embodiments are shown in FIGS. 2, 3, 4, and 5.

Facial Recognition Description Kinect

Figure 3:
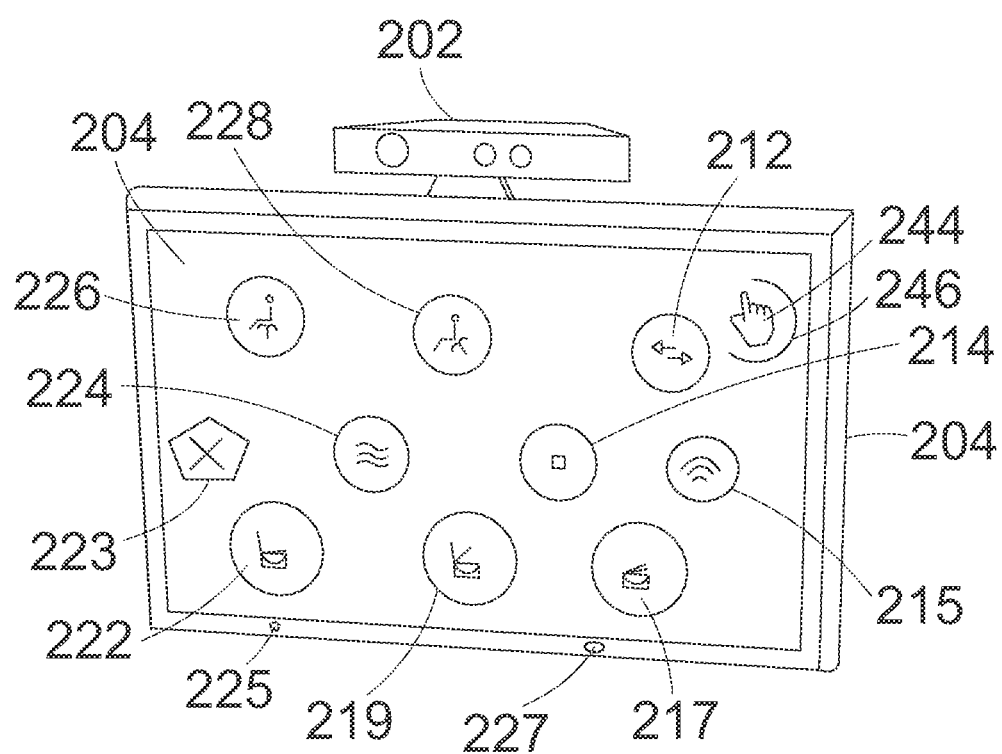
FIG. 3 is a front perspective view of a Kinect sensor facial recognition and identifying device, and a display.
Figure 4:
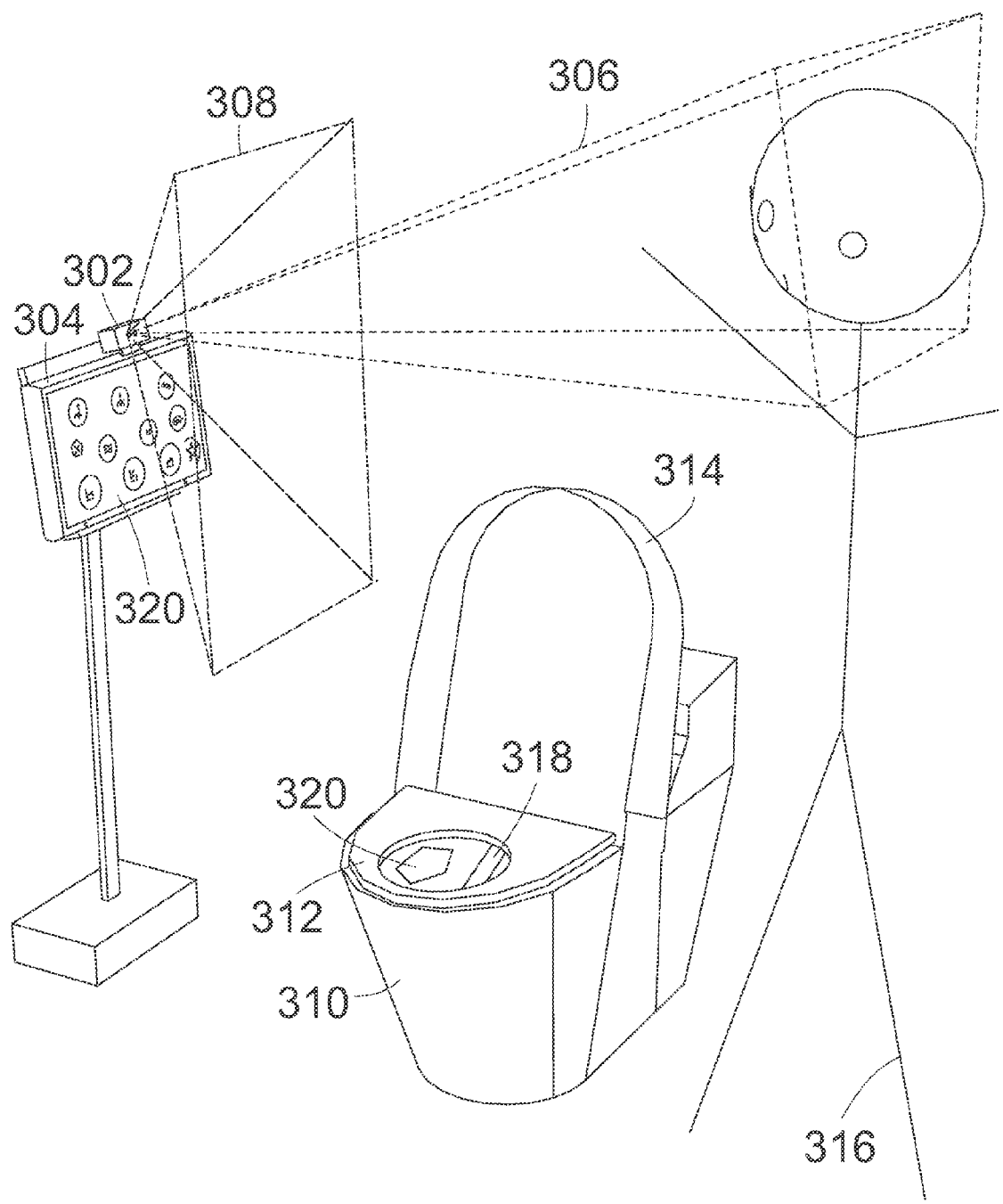
FIG. 4 is a front top left side perspective view, of the Intel sensor facial recognition and identifying device, a display, smart toilet and an automatic bidet.

In FIGS. 3 and 4, the Kinect for Windows sensor 202 is optimized for use, with computers and devices running Windows 8, Windows 7, and Windows Embedded based devices. Features of the sensor include: enabling the sensor's camera 202 to see objects as close as 40 centimeters in front of the device, without losing accuracy or precision, with graceful degradation out to 3 meters. Kinect facial recognition software 216, Kinect user's identifying software, made by the Microsoft Company, and programmed into the computer 216.

The Kinect for Windows SDK has a deep understanding of human characteristics, including skeletal and facial tracking, and gesture recognition. Voice recognition adds an additional dimension of human comprehension, and Kinect Fusion reconstructs data into three dimensional (3D) models. The Kinect for Windows SDK exposes an array of sensor data and provides developers with effective tools to optimize their use of that data: developers can access extended depth data and the sensor's infrared IR emitter, and can control the custom color camera settings. Kinect Studio, a record and playback tool, enables developers to optimize the controls for a fine tuned application. Kinect Interactions comprehend natural gestures such as "grip" and "push," and includes Kinect Fusion, a tool that creates 3D reconstructions of people and objects in real time.

A Kinect sensor 202, in FIGS. 3 and 4, made by the Microsoft Company, of Redmond Wash., USA, is connected to a Sony all in one computer 216, by a USB wire connection, and generates real time depth, color and audio data of the scene in front of a Liquid Crystal Display LCD display 204, the display 204 could also be a plasma display. The Kinect 202 does not require a user to wear or hold anything and does not require calibration.

The Kinect sensor 202 attaches to a Sony display 204. The display 204 attaches to a wall 142 or stand. The display 204 connects to the computer 216, by wire, and can also use a Bluetooth wireless connection. The Kinect user facial interaction zone 212, has an optimal range of use is 0.4 to 3 meters from the Kinect sensor. The Sony computer 216 connects to a toilet motor controller (not shown), by wire. The computer 216 and motor controller could also use Bluetooth radio waves, with Bluetooth transmitters and receivers in the computer 216 and Bluetooth transmitters and receivers connected to the motor controller. The computer and motor controller, could use a Wi-Fi area connection to connect to each other, with WIFI transmitters and receivers in the Sony 216, and in the toilet motor controller (not shown). The motor controller connects to a bidet 220, seat servo motor and to a lid servo motor (not shown), etc. by wire.

Evoluce software made by Evoluce Ag of Bunch am Erlbach, Germany, is programmed into the Sony computer 216. Evoluce software 216 works with Kinect for Windows software 216 which is programmed in the computer 216, the software empowers personal computers PCs with natural interaction capabilities. Kinect for windows software developers' kit maybe used to program the system. Microsoft windows 7 or windows 8 software can be used. Evoluce software may be used to program the system.

The processors may be any conventional processor, such as processors from Intel Corporation or Advanced Micro Devices. The Sony 216 can be programmed with Apple, Nokia S40, Blackberry, Qualcomm, Linux or Microsoft's operating system software.

The Sony 216 connects to the internet (not shown) using a WIFI connection, and by activating the internet icon button 116. The WIFI receiver 216 is incorporated within the computer 216. The Sony liquid crystal display 204 can show internet content, such as internet videos. With a speaker 227 and microphone 225 incorporated within the display 204, the user can make internet video calls. The user can search the internet, by interacting with the Evoluce software 216, Kinect 202 and the display 204. The user 218 can surf the internet, view internet web pages, watch internet TV, watch cable TV, view internet content and view and listen to internet videos. The user can search the internet with the results displayed on the display face 129. Internet search engine results, can be displayed 204. Search engines such as Google, Yahoo, or Safari etc., can be used. The user may verbally chat with people, using the internet connection. The user may leave video messages on the display 204, for other users to access, activate and view.

An alternating current supplies power to the smart toilet 108, by a wire connection (not shown), to the display 204 by a wire connection (not shown), to the computer 216 by a wire connection (not shown), and to the Kinect 202 by a wire connection. The toilet 108, display 204, Kinect 202 and computer 216 could also be powered by a direct current battery (not shown). A warm dry air blower (not show) blows warm dry air on the display screen 204 to reduce fogging of the screen 204. The screen 204 senses when the screen 204 maybe fogging, and automatically turns the screen defogger on.

For safety the system motors turn off, if a voltage overload is detected. The voltage overload may be caused, by a user contacting the moving seat 208 or lid 210 while they are moving. A slip clutch (not shown) between the motor and the part being moved, such as moving the seat 208 or lid 210 up or down, limits to a safe level the amount of force applied to a user, contacting the moving part. The motor or motors are turned off, when shaft rotation sensors (not shown) may be used to detect, when the seat 208 and lid 210 have reached their up or down position. The Sony 216 signals the motor controller to supply a voltage, to the motors or motor, to move the seat motor 136 and or lid 156 motor, clockwise or counter clockwise, which raises or lowers the seat 208 and or lid 210.

Devices like the Microsoft Kinect for Windows sensor 202, can either sit on top of or next to the screen 204. The Kinect for Windows sensor 202 is body movement recognition hardware, connected to the Sony PC 216, by a universal serial bus USB. The avatar is controlled, by the user's body movement system. The Kinect sensor 202 and display 204 face the toilet area, and collect data about the scene in front of the sensor.

Kinect software 216 is programmed in the computer 216. A Microsoft operating system software window 7 216, is programmed into the computer 216. Evoluce Multi touch & Gesture software, volume Win&I software, image and Video Viewer for Kinect for Window, media Viewer for Kinect for Window and PowerPoint Presenter for Kinect for Windows software application 216, is programmed in the computer 216.

The computer 216 is connected to the motor controller, by wire. The computer 216 is powered by a connection to an alternating electrical current, and the motor controller is powered by a connection to an alternating current. The motor controller supplies power, to the toilet electrical components by wire. The Evoluce display 204, is powered and connected to an alternating power supply.

The display 204 shows toilet functions icons, such as, user profile icon 223, lid up 222, seat up 219, seat down 222, seat and lid down 217, bottom air dryer blower icon 224, bidet front wash activate icon 226, bidet back wash activate icon 228, bidet wand forward and backward movement icon 212, stop button icon 214, internet connection to computer icon 215. Other toilet functions could be displayed such as, bidet water aerator, air deodorizer, air filter, air negative ion generator, automatic toilet flushing device, toilet seat massager, antibacterial ultraviolet light, recorded sound playing system, bidet water pressuriser, etc.

The Kinect for Windows software developer's kit or Microsoft Robotics Developers Kit, can be used to program the Sony 216, for the Kinect sensor 202. An Intel perceptual computing software developer's kit, could be used to build applications for the smart toilet applications. The Microsoft Software Developers Kit can be used to build, smart toilet function applications.

Various programming languages can used to program the computer such as C++, C#, and Microsoft Visual Studio Ultimate, FAAST key mapping software, Microsoft Visual Programming Language, Microsoft NET 4.0 XNA 4.0, Silverlight 4.0, and Visual Basic.NET. This Software Developer's Kit allows developers to write Kinect applications in C++/CLI, C#, Microsoft Visual Programming Language, or Visual Basic.NET.

The Microsoft Robotics Developers Studio application contain a graphical environment, Microsoft Visual Programming Language: (VPL) command line tools, which may allow a developer to deal with Visual Studio projects (VS Express version), by possibly using C#, and 3D simulation tools.

The computer 216 may be programmed using, the Microsoft windows commercial software development kit, or Linux operating system, or Android operating system. Or Blackberry operating system, or apple operating system.

Computer program 216 code for carrying out operations of the object detection and selection mechanism may be written in any combination of one or more programming languages, including an object oriented programming language such as Java, Smalltalk, C++ or the like and conventional procedural programming languages, such as the "C" programming language or similar programming languages. The program code may execute entirely on the computer, partly on the computer, as a standalone software package, partly on the computer and partly on a remote computer or entirely on the remote computer or server. In the latter scenario, the remote computer may be connected to the computer through any type of network, including a local area network (LAN) or a wide area network (WAN), or the connection may be made to an external computer (for example, through the Internet using an Internet Service Provider).

These computer program instructions may also be stored in a computer readable medium, that can direct a computer or other programmable data processing apparatus to function in a particular manner, such that the instructions stored in the computer readable medium, produce an article of manufacture including instruction means, which implement the function act specified in the flowchart and or block diagram block or blocks.

The computer program instructions may also be loaded onto a computer 216 or other programmable data processing apparatus, to cause a series of operational steps to be performed on the computer 216, or other programmable apparatus to produce a computer implemented process, such that the instructions which execute on the computer or other programmable apparatus, provide processes for implementing the functions or acts specified, in a flowchart and or block diagram block or blocks.

Figure 7A:
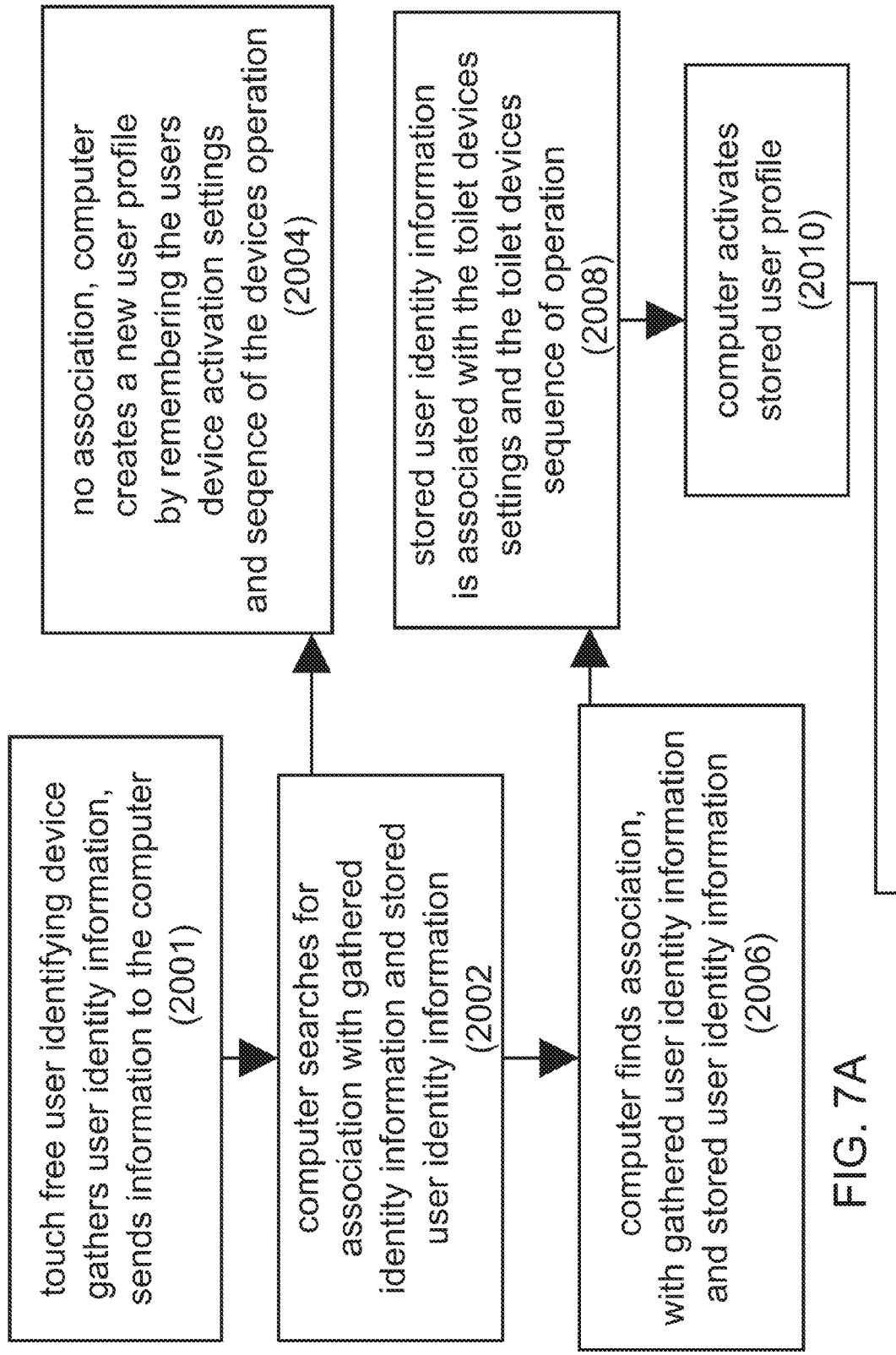
FIG. 7A-7B shows a flowchart illustrating a process, for operating embodiments of the user recognition and automatic bidet assembly.
Figure 7B:
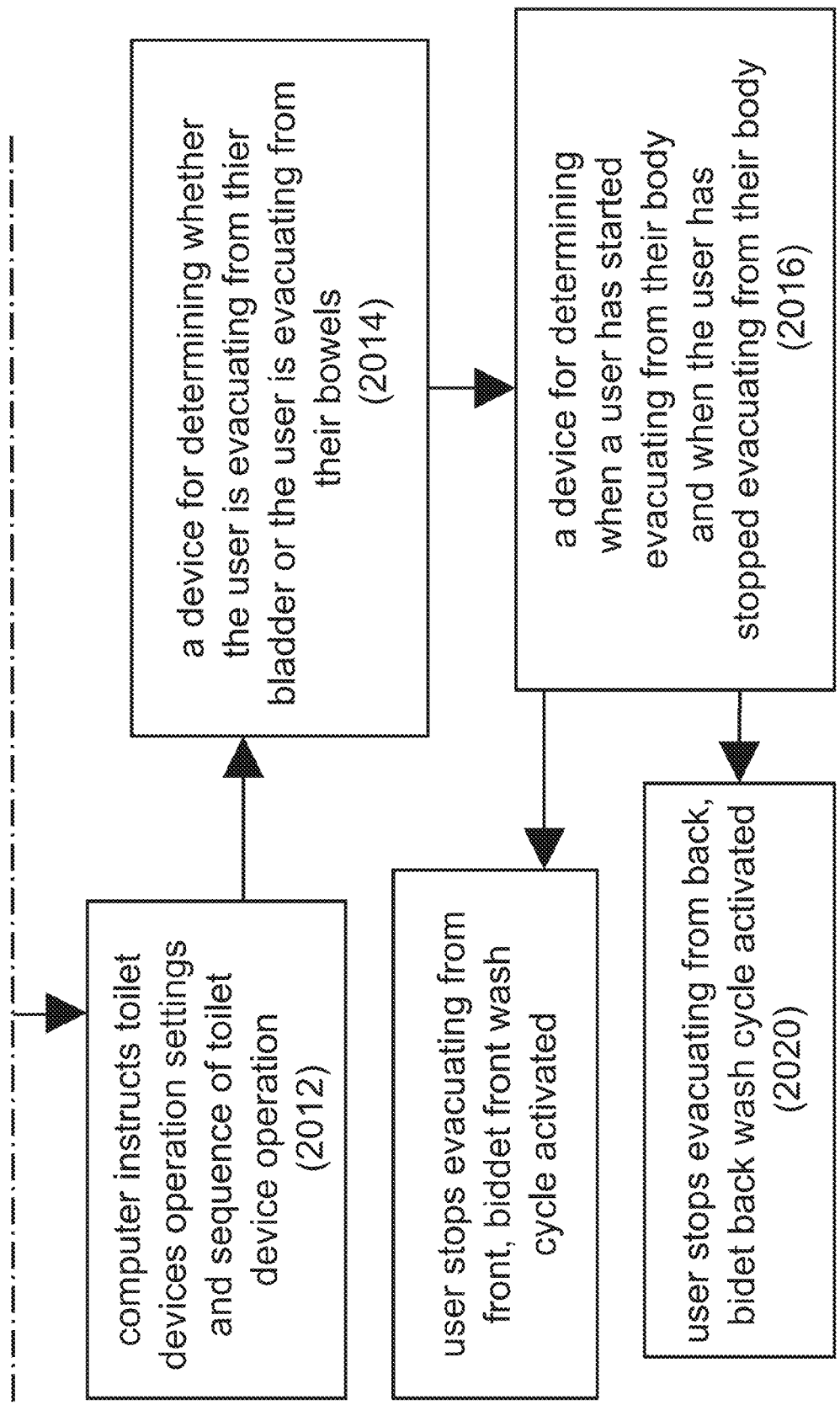

The flow cart in FIGS. 7a and 7b may include the following steps, (a) touch free user identifying device gathers user identity information, sends information to the computer 2001, (b) computer searches for association with gathered identity information and stored user identity information 2002, (c) no association, computer creates a new user profile by remembering the users device activation settings and sequence of the devices operation 2004, (d) computer finds association with gathered user identity information and stored user identity information 2006, (e) stored user identity information, is associated with the toilet devices settings and the toilet devices sequence of operation 2008, (f) computer actives stored user profile (2010), (g) computer instructs toilet devices operation settings and sequence of toilet device operation (2012), (h) a device for determining whether the user is evacuating from their bladder or the user is evacuating from their bowels (2014), (i) user stops evacuating from Front, bidet front wash cycle activated a device for determining when a user has started evacuating from their body and when the user has stopped evacuating from their body (2016), (j) user stops evacuating from back bidet back wash cycle activated (2020).

Figure 8:
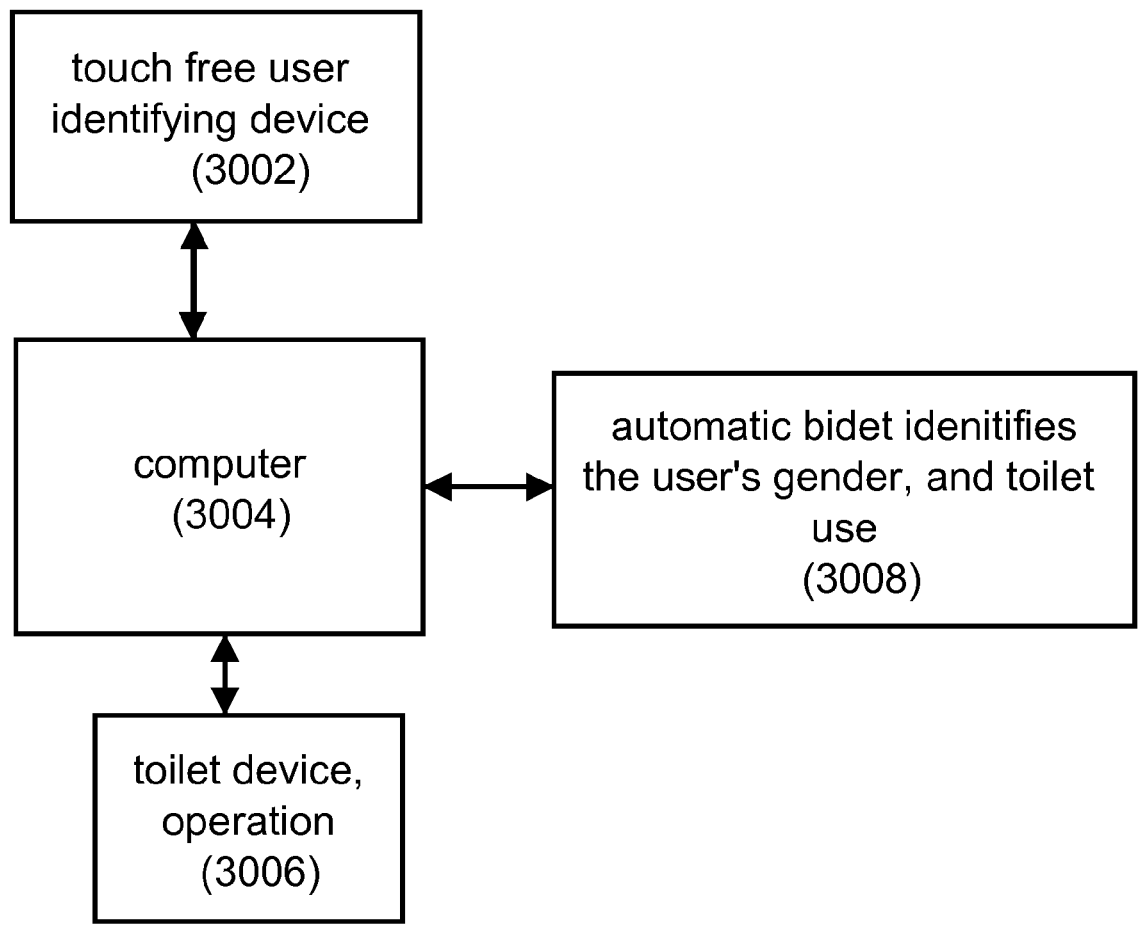
FIG. 8 shows a block diagram illustrating the general architecture, of embodiments of the user recognition and automatic bidet assembly.

The flow cart in FIG. 8 may include the following, touch free user identifying device (3002), computer (3004), toilet device, operation (3006), automatic bidet identifies the user's gender, and toilet use (3008).

The Sony computer 216 can signal the motor controller to activate the bidet 220, heated seat, seat and lid motors, bottom air dryer, bidet water temperature heater, etc. The Kinect sensor 202 is connected to the computer. The computer 216 is connected, to the motor controller. The motor controller is connected, to the motors (not shown). The bidet 220 connects to a common, standard pressurized water supply, (not shown).

The Phigets motor controller (not shown) is programmed with Phigets software, made by the Phigets Company, 216. Phigets motor controller software 216 is programmed into the computer 216. The motor controller is connected to either an alternating electrical power supply, or to a direct current power source, and directs power to the other electrical components.

The all in one computer 216 includes components, such as, a 61 centimetre touch screen, a 8 GB Memory, a 2 TB Hard Drive, a Windows 8 64 bit Technical details, a 3rd Gen Intel Core i7 processor; a 61 centimetre display; a 2 TB hard drive, a touch screen; a Blu ray playback; a TV tuner; built in wireless networking; Bluetooth; wireless keyboard and mouse; and HDMI output;

The computer 216 could also be chosen from a variety of other comparable computers, such as a Dell computer. The computer 216 could also be a laptop computer, a desktop computer, a portable computer, and a tablet computer, etc.

The touch free user identity recognition device means, the computer 216 the Kinect for Windows sensor 202, Kinect user facial recognition and facial identifying software 216, made by the Microsoft company, Microsoft operating system software 216, the computer and Satis toilet application software 216.

The touch free user input device means, is the Kinect sensor 202. The touch free user input device software means, is the Evoluce Multi touch & Gesture software, Evoluce Win&I software, image and Video Viewer for Kinect for Window 216, and Microsoft operating system software 216, the computer 216 and Kinect for windows software 216.

Kinect Facial Recognition Operation

In FIGS. 3 and 4, the facial recognition information system matches image information of a user 218, from the Kinect camera 202, with stored images information, of the user, in the computer 216. The matched stored images, are associated with a user's profile 216. The users profile is associated with settings for a variety of toilet devices. The settings can be instructions for the activation and deactivation, of the toilet devices. The user's profile 216 can follow a sequence of device activations and deactivations of the various toilet devices. The computer 216 sends the toilet device instructions, to a motor controller inside the toilet assembly 206. The motor controller activates the devices, following the received device activation instructions. The sequence of instructions, follows the user's stored profile, of device activation sequence and settings.

To interact with the display, the user moves their hand in front on of the screen 204 and Kinect sensor 202, which is in the user inter action zone 214. The user hand inter action zone is from about 0.8 to 3.5 meters from the Kinect sensor. The hand controls a cursor 144 viewed in the display, either hand can be used. The pointer follows the hand movement of the user 218. The user points the palm of their hand toward the screen 204, and moves the cursor, which is shaped like a hand, on the screen, over the toilet function icon they want to select, such as the front wash bidet icon 216. The user moves the pointer, cursor 244 to the desired menu toilet option. When the cursor touches the icon function, the icon is highlighted, changes color, or is illuminated. The user activates the toilet device bidet function, by holding the hand controlled cursor on the icon, which starts a visual timer 246, after a specified 1 second's time the icon function activates. The visual timer 246 is a encircling of the cursor hand, 244 by a circular line 246.

The activated function request is processed by the Sony computer 216. The computer 216 requests the motor controller to send a voltage to the bidet. The bidet 220 receives the voltage and activates. The bidet 220 completes a wash cycle, and the computer 216 deactivates the bidet 220. The computer 216 sends the motor controller instructions to stop the voltage to the bidet 220. The motor controller stops the voltage to the bidet 220. The bidet 220 stops receiving a voltage and stops functioning.

Facial Recognition Intel Description

A facial recognition system may use Intel facial recognition software made by the Intel Company of Santa Clara, Calif., which is programmed into a Hewlett Packard all in one computer 304, made by the Hewlett Packard Company of Palo Alto, Calif. A Satis smart toilet 310 made by the Lixil company of Tokyo, Japan, is connected by wire to the computer 304. A Satis Smart toilet Software 304 or Kohler Numi toilet software made by the Kohler Company of Kohler, Wis., or Toto smart toilet software made by Toto Company of Tokyo, Japan is programmed into the computer 304. Intel perceptual computing interactive display software 304 is programmed into the computer 304. The computer 304 is programmed with Windows 7 or 8 operating software 304. The computer 304 has data storage.

The facial recognition system uses Intel's perceptual computing software 304, and an Intel developer kit creative interactive gesture camera 302. The camera 302 is a small, lightweight, USB powered camera 302, optimized for close range interactivity. The camera 302 is designed for ease of setup and portability; it includes a high definition HD webcam 302, depth sensor 302 and built in dual array microphones 304 for capturing and recognizing voice, gestures and images. The camera 302, when paired with the Intel Perceptual Computing software developers kit SDK Beta 302, enables developers to create software applications that incorporate close range hand tracking, speech recognition, face analysis, two dimensional and three dimensional 2D/3D object tracking, on laptops and personal computers PCs. The computer 304 and Satis toilet 310 can use an electrical alternating current power supply. The computer 304 has a display 320. The camera facial identifying zone 306 is about 0.5 meters from the camera. The user's computer user input zone 308, is about 0.5 meters from the camera.

The touch free user identity recognition device means, is the Intel developer kit creative interactive gesture camera 302, Intel's perceptual computing software 304, Intel facial recognition software 304 Microsoft operating system software 304, the computer, and Satis toilet application software 304.

Facial Recognition Intel Operation

The facial recognition system matches image information of a user 316 from the Intel camera 302, with the stored images information of the user in the computer 304. The matched stored images are associated with a user's profile 304. The users profile is associated with settings for a variety of toilet devices. The settings can be instructions for activation and deactivation of the toilet devices. The user's profile can follow a sequence of device activations and deactivations of the various toilet devices. The computer 304 sends the toilet device instructions to the Satis toilet 310. The toilet activates the devices, following the received device instructions. The sequence of instructions follows the user's stored profile, of the devices activation sequence and settings. For example having the seat move 312 to the down position and the lid 314 moving to the up position. Also when the computer 304 senses the user has occupied the seat 312, the device activation sequence can continue.

A ultrasound sensor, a infrared sensor, a laser sensor or a combination of sensors (not shown), detects when the user emits fluids form their bladder or solid material from their bowel. The toilet material sensor can activate the users profile when the user is seated, the sensor detects when liquid is emitted from the front of the user, or material is emitted from the back of the user, or emitted from both front and back. The computer 304 can follow three possible user preprogrammed device operation profiles. The computer 304 can run the users front wash and dry front profile, the users back wash and dry back profile, or the users front and back wash and dry front profile.

The laser sensor detects when the user has stop emitting fluids or material the computer 304 can start a user pre-set clock cycle of 60 seconds, if the laser sensor doesn't detect material emitted from the user in that time period, the computer assumes the user has finished the evacuation process. With the evacuation process complete, the computer 304 activates the bidet 318 front wash, the front wash can activate and cycle through a 35 second wash cycle, with the water temperature set to mild, the water pressure spray set to mild, the water aerated. When the bidet 312 wash has completed its cycle, the bottom air dryer (not shown) activates, directing drying air at the user's bottom. The dryer having a setting of high air flow and medium air temp, the air blower follows a timed 30 second cycle and turns off at the end of the cycle, when the user vacates the toilet seat the lid 314 can be lowered, the toilet 310 can automatically flush. By lowering the lid 314 before flushing the toilet 310, airborne water droplets caused by the flushing of the toilet, can be contained in the toilet bowel and lid compartment. The users 316 airborne bacterial contamination may also be minimized, by minimizing their spread in the air of the airborne water droplets, which may contain bacteria The user 316 can set their toilet device profile, by using the Intel interactive system, and setting their devices to their desired settings, then activating the save Icon button (not shown), on the touch free inter active display. The user 316 uses their hands to move a representation of their hand in the three dimensional space to touch the icon button. The user touches the save button icon in the three dimensional displayed space, the touching of the icon highlights the save icon. A further touching in a double clicking action, actives the save icon of the highlighted icon, actives the save icon. The user's saved device operation profile is associated to the user's identity.

The user 316 can change the sequence of the devices operations or settings, by accessing the three dimensional display, and viewing their profile and menu options associated with each device and choosing the desired option. Once the desired option is chosen the user 316 activates the save button. Activating the save button saves the new user profile, and will be used when the user activates the toilet with their facial image 316.

A second way to change the device settings in the user profile, is the computer 304 can remember the user interaction with the toilet 310. The computer remembers the sequence of the devices used, and the settings of the devices. If the user 316 changes the devices sequence or the devices settings, the computer 304 will remember the change, in the user profile, and will use the changes in a new profile, the next time the user 318 uses the toilet 310.

A third way the user's profile can be programmed into the computer 304, is on initial use, the computer 304 checks the user's image, with stored user images, if the computer 304 doesn't find a match with the new user's identity and stored identities, the computer 304 classifies the user as a new user. The computer creates a new profile for the new user. The user's 316 image is saved, and the saved image is associated with the image in the new profile, and the user's toilet device operation sequence and toilet device setting are saved. The computer 304 remembers the user's chosen preferred toilet device settings, if the user activates the devices manually or by using the interactive display to activate or deactivate the toilet device.

For example if on initial use the computer discerns that the user is a new user, the computer saves their image in a new user profile. If the user moves the seat to the down position and lid to the up position manually using their hand, the computer saves the seat setting sequence to the new user profile, the user uses the three dimensional display to operate the bidet back wash, with a warm water setting, the user to manually end the bidet wash cycle, by activating the spot icon button on the display.

The computer will remember these user's device preferences and setting and use this profile, to activate these devices, the next time the user's image is recognised, and is matched to their stored image.

The user can interrupt the sequence of device activations, by activating the stop button on the display screen. Once the sequence is deactivated, the user can choose to activate individual toilet devices using the three dimensional; hand interactive display.

The display gives feed back to the user by showing that the device has activated, and showing when the device has deactivated. The display feedback May be the changing of color, of highlighting of the device function icon. If more than one person is in the bathroom, the computer will only follow the first recognized users, profile. A different profile can be activated if a user chooses to active and other profile, by using the interactive display to double click on a different user profile. A user can also have many user created pre-set profiles, that they can choose from, such as, front wash bottom dry profile #3, back wash no dry profile #4.

Figure 5:
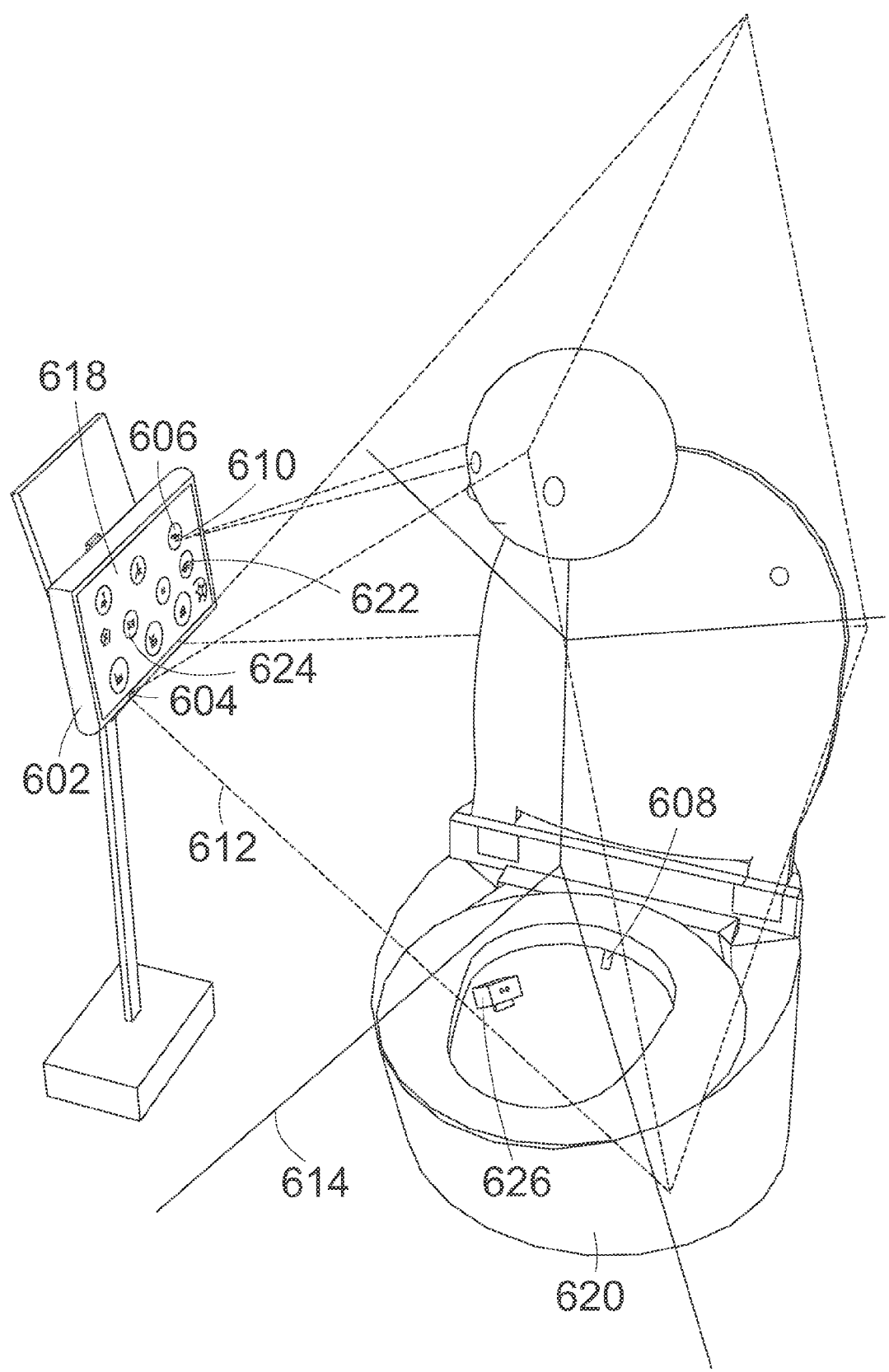
FIG. 5 is a front top left side perspective view, of the Tobii sensor eye recognition and identifying device, a display, smart toilet and an automatic bidet.
Figure 6:
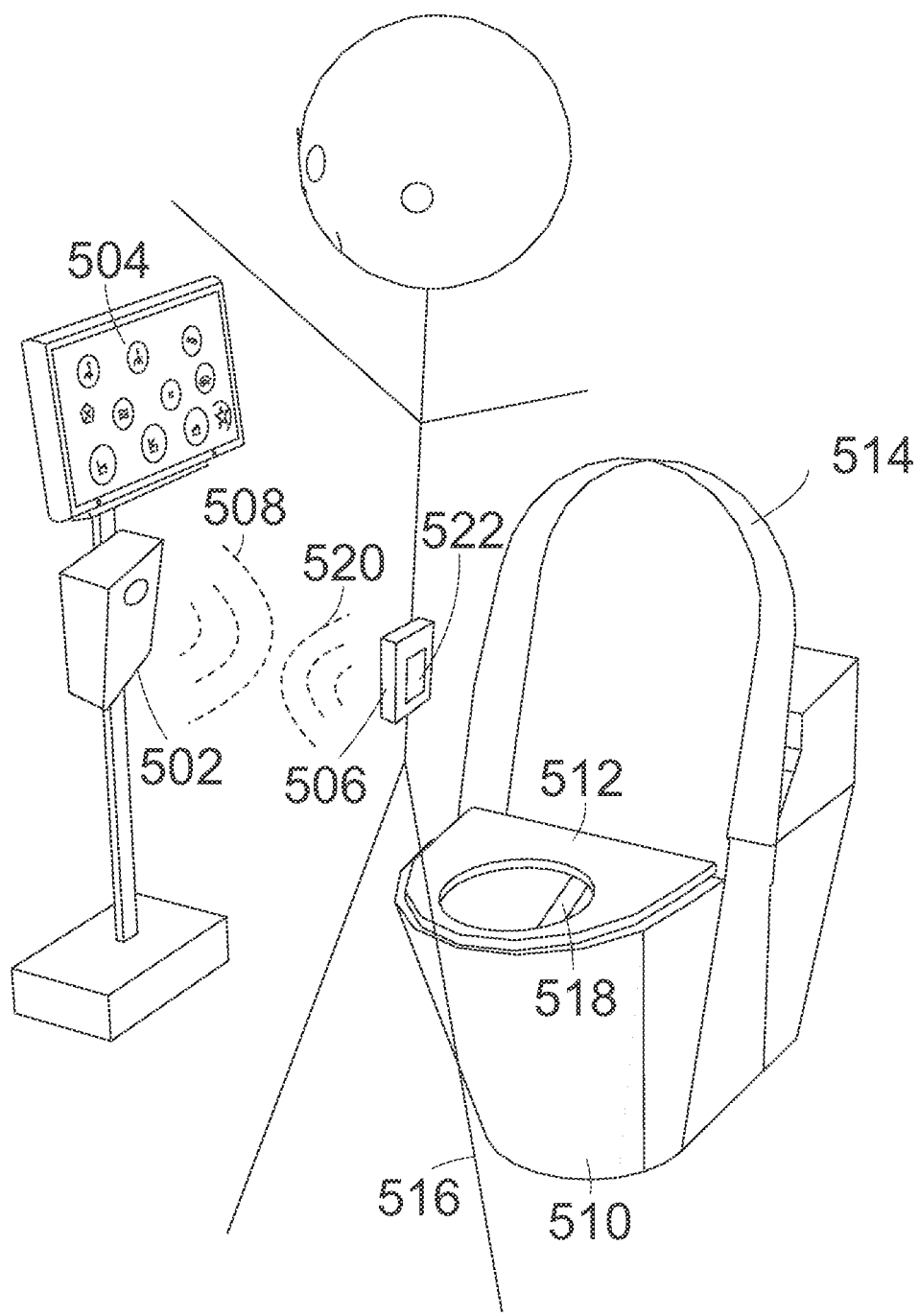
FIG. 6 is a front right side perspective view of a HID proximity detector, a proximity card, a display and a smart toilet.

The bidet 608 can be operated manually in FIG. 5, with the user inputting the bidet's operating settings, or automatically by identifying the user's gender 614. The automatic bidet 608 can be activated when activating the user's profile. The Intel camera 626 in the toilet bowl 620 area may identify a user's gender. With the user's 614 gender identified and the user's evacuation process monitored, the bidet 608 can start a wash cycle, which is specific to the user's gender.

The touch free user avatar activating toilet control panel system, may use the automatic bidet device 608 to automatically wash a user 614. The automatic bidet 608 may include the following components. A camera 626 can be an Intel perceptual computing camera sensor 626 or a Microsoft Kinect for windows camera sensor. With the Intel camera 626, the user interaction zone extends from around 20 centimeters to about 1 meter from the front of the Intel camera 626. The computer 602 is connected to the camera 626 by wire. The computer 602 can be programmed with Intel perceptual computing gesture recognition software 602 made by the Intel company.

The Intel perceptual computing gesture recognition software 602 made by the Intel Company, of Santa Clara, Calif. A Intel Perpetual computing software developer's kit SDK, or Microsoft Kinect for windows software, can be used to create the software, for user genital recognition, genital position detecting, and genital evacuation monitoring. The Intel perceptual computing camera sensor 626 is inside the toilet bowl 620. The camera 626 is water proofed. The camera 626 connects to the computer 602, and is powered by an alternating current. The camera 626 is cleaned after each use by, a camera water cleaner (not shown), using pressurized water flowing over the camera. A light (not shown) illuminates the inside of the toilet bowel, to aid the camera in viewing, the user's bottom.

The user profile, the toilet's devices activation sequence and the toilet device settings, used together with the automatic bidet, may use the automatic bidet device 608 to automatically wash a user. The automatic bidet 608 allows the user to complete a toilet activation sequence, without having to add further input, once the user profile has been activated.

The camera 626 detects when the user emits fluids from their bladder or solid material from their bowel. The camera 626 detect the male or female gender of the user, by viewing the user's genital area, and associating the users genital area with pre stored male and female genital information. When a genital association is made the computer 602 identifies the gender of the user. The camera 626 is used to detect the user's front or back position of evacuation. A toilet sensor (not shown) connected to the computer 602, which can detect when the user is seated, allowing for the activation of the user's profile. The camera 626, detect when liquid is emitted from the bladder, front of the user, or when material is emitted from the bowel, the back of the user, or emitted from both front and back. The computer 602 may follow three possible user preprogrammed device operation profiles. The computer 602 can run the users front wash and dry front profile, the users back wash and dry profile, or the users front and back wash and dry profile. The user can stop the automatic cleaning cycle by activating the stop button. The user can create and input, their user automatic bidet profiles in to the computer, using the eye input display screen 618.

The Intel camera 626 detects when the user has stopped emitting fluids or material, the computer 602 can start a user pre-set clock waiting cycle of 60 seconds for back evacuation, and 25 seconds for front evacuation. If the camera 626 doesn't detect fluid or material emitted from the user in those time periods, the computer 602 assumes the user has finished the evacuation process. The camera 626 identifies, whether the user is male or female. The camera 626 identifies that the user is of the female gender, this activates the possibility of using of the front wash and back wash. If the user is of the male gender this activates the possibility using of the back wash.

As an example, when the female bowel evacuation process is complete, the computer 602 activates the bidet 608 back wash, the back wash can activate and cycle through a 45 second wash cycle, with the water temperature set to warm, the water pressure spray set to medium, the water aerated. When the bidet 608 wash has completed its wash cycle, the bottom air dryer (not shown) activates, directing drying air at the user's bottom. The dryer having a setting of medium air flow and medium air temp, the air blower follows a timed 30 second cycle and turns off at the end of the cycle, when the user vacates the toilet seat, the lid can be lowered, and the toilet 620 can automatically flush.

In an alternate automatic bidet 318 embodiment, the user information detecting devices can be placed in a different device configuration. In FIG. 4, the camera 302 can be positioned to view the user's face 316, using the user's face and body to identify the user's gender. User position and motion devices 320 such as laser sensors, ultra sonic range finder sensors, infrared sensors, camera and visual sensors, can be used inside the toilet bowl 310 area. The ultra-sonic range finder and laser sensor 320 determines a user's front or back elimination position. The sonic and laser sensors 320 determine the user's started and end of elimination.

Additional Sensors (not shown) can also detect weather liquid is being eliminated, or solid material is being eliminated.

Tobii Eye Recognition Description

The Tobii, eye tracker 604, eye tracking sensors 604 made by the Tobii Technology Company of Danderyd, Sweden is connected to a Acer all in one computer display 602. The computer is programmed with Tobii eye tracking software 602, Satis toilet software 602 and Microsoft operating system software 602. The Acer all in one computer 602 is power by a connection to an alternating current; the toilet is made by Lixil Company of Tokyo, Japan. The toilet is connected by wire to the computer. The distance which a user can interact 612, the user interaction zone 612, with the Tobii cameras 604 installed in the display 602, is from 20 centimeters to 2 meters. The Acer computer 602 connects to the internet using a WIFI 602 connection. The Acer 602 is programmed with Satis Toilet control software application 602, and used with an android 2.3 platform 602.

The touch free user identity recognition device means, is the Tobii, eye tracker 604, eye tracking sensors, Tobii eye 602 software 602, Microsoft operating system software 602, the computer 602 and Satis toilet application software 602.

Tobii Eye Recognition Operation

A sensor (not shown) senses and signals the computer 602, when the user is in the eye interaction range 612 of 20 centimeters to 2 meters from 612 the display face 618, when the user is in range the computer activates the system. The user looks at the display screen and the Tobii eye tracker hardware images the user's eyes. Within in about 1 second the user's eyes 614 are identified.

The computer 602 searches for a match between the user eye image information and the user's stored eye image information. When the user's eye information is matched, the user's profile is activated. The user's stored eye information is associated to the user's profile. The user's profile includes the toilet device settings and the toilet device sequence of operation. The users profile contains toilet device preferences. The preferences may include the preferred seat and lid positions, toilet seat temperature, bidet water temperature, bidet water spray pressure and internet connection to the computer, etc. The computer 602 sends the device setting information to the Satis toilet 620. The toilet 620 activates the devices in accordance with the users profile settings.

The eye tracker can be used to activate the displayed toilet function icons. Before an eye tracking starts, the system calibrates to the user's eyes. The eye tracker 604 calibrates to a uses eye after about 3 seconds. By identifying individual eye characteristics, the eye tracker can estimate the gaze point with very high accuracy. Tobii eye trackers can even use a calibration free setup, where calibration is carried out undetected by the user. The Tobii eye tracker 604 incorporates near infrared micro projectors 604, optical sensors 604 and image processing 604. Micro projectors 604 create reflection patterns on the eyes 614. Image sensors 604 register the image of the user 614, the eyes and the projection patterns 614, in real time. Image processing 604 is used to find features of the user eyes 614, the eyes 614 and projection patterns 614. Mathematical models are used to exactly calculate the eyes position and gaze point.

Eye tracking is fast, intuitive and natural. The gaze point 610 or dwell point can be focused on the chosen toilet function icon, such as the bidet wand mover 606. The wand icon 606 is highlighted, when gazed 610 at for a time period of 500 microsecond, or 0.5 seconds to 900 microseconds; or 0.9 seconds. The wand icon 606 is activated by continued gazing at the icon for a specified amount of time of 500 microseconds to 900 microseconds. For example the user can connect the computer to the internet, by gazing at the internet connect icon 622.

For example the computer 602 associates the activated menu function, such us the bidet wand forward and back wand mover 606 icon, with the toilet device. The computer 602 instructs the Satis toilet 620 to supply power to the component that's being activated, the bidet forward and back wand mover 608. The component activates, the bidet forward and back wand mover 608 activates.

Proximity Card Used for Identifying a User Description

The touch free user identification system may include, a proximity card reader 502, and a proximity card 522 which can communicate with the proximity card reader 502, using radio waves. Easy Lobby HID proximity card software 504 or other HID software, made by the HID Company of Irvine Calif., and is programmed into a Lenovo all in one touch screen computer 504. Microsoft operating system windows 8 software 504, and Satis smart toilet software 504 is programmed into the computer. The proximity card may be attached to a cell phone. The user can program the toilet profile settings by using the profile settings menu, displayed on the touch screen display. A proximity card encoder (not shown), encodes the user's information into the card.

The touch free user identity recognition device means, is the a proximity card reader 502, a Proximity card 522, Easy Lobby HID proximity card software 504, Microsoft operating system software 504, Satis toilet application software 504 and the computer 504.

Proximity Card Used for Identifying a User Operation

The user 516 is identified by the card read 502, which reads the proximity card 522, which is carried by the user 516. The user's 516 identity is associated with the user's toilet device profile. The card reader 502 reads the card's 522 user profile information. The user 516 carries the proximity card 522, within an interaction range of from the card reader surface to 200 centimeters. The card 522 activation range distance can be changed by the user 516. The activation range maybe limited to the distance inside the bathroom. The card reader 502 identifies the user 516 by reading the users card 522. The computer matches, associates the identified user with the user's stored toilet device settings and the toilet devices sequence of operation. Radiofrequency identification (RFID) is the wireless non-contact use of radio frequency electromagnetic fields to transfer data, for the purposes of automatically identifying a user 516, the data on the card is a string of binary numbers.

The users profile contains toilet device setting preferences. The profile may include the users preferred seat 512 and lid 514 positions, the toilet seat 512 temperature, a bidet 512 settings, the bidet's water temperature 518, the bidet's water spray pressure, and Internet connection to the computer, etc.

The computer 504 sends the device setting information to the toilet 510. The Satis activates the devices in accordance with the users preferred profile settings and sequence of device activation and deactivation. The card encoder 502 can be used to program the user's toilet profile settings into the card 522. The card 522 may use radio frequency identification (RFID), for the purposes of automatically identifying the card user. The card reader 502 uses radio frequencies 508 to communicate with the card with radio waves 520. The data on the card 522 is a string of binary numbers used to associate the card 522 with the user 516. The card 522 can be attached to a cell phone 506.

CONCLUSIONS, RAMIFICATIONS AND SCOPE

CONCLUSION: From the preceding description and drawings it becomes apparent that a user, may passively use the input of their presence to operate the toilet devices. Without having to use active input to operate the toilet devices, a user may operate the toilet devices.

Further passive ways to activate the toilet devices passively, may be using smell recognition, using a device for identifying a user by their unique smell. Another passive input embodiment may use a brainwave recognition device, for identifying user's unique brainwave patterns. Another passive input embedment may use a non touch hand recognition device, to identify a user's hand. Using a non touch finger print recognition device, to identify a user's finger print. A non touch voice pattern recognition device, could be used to identify a user's voice pattern. Using a non touch cell phone recognition device, to identify a user's unique cell phone broadcast signal. The toilet seat assembly may be made out of water resistant high strength plastic, wood, metal, rubber, and the like.

While the foregoing written description of the embodiments enables one of ordinary skill to make and use what is considered presently to be the best mode thereof, those of ordinary skill will understand and appreciate the existence of variations, combinations, and equivalents of the specific embodiment, method, and examples herein. The embodiments should therefore not be limited by the above described embodiments, method, and examples, but by all embodiments and methods within the scope and spirit of the embodiments.

Thus the scope of the embodiments should be determined by the appended claims and their legal equivalents rather than by the examples given. Thus the reader will see that at least one embodiment of the touch free toilet panel control assembly provides a more reliable, healthier and economical device that can be used by persons of almost any age. It will be apparent that various changes and modifications can be made without departing from the scope of the various embodiments as defined in the claims. Although the embodiments have been described in connection with various embodiments, it should be understood that various modifications, additions and alteration may be made to the embodiment by one skilled in the art without departing from the spirit and scope of the embodiments as defined in the appended claims.

I claim:

1. A facial recognition bidet configured to activate a bidet setting associated to a user when the user is identified, comprising:
   (a) a camera connected to a computer and the camera positioned to view the user's face when the user is near the bidet,
   for the camera to image the users face,
   for the computer to receive the image of the user's face,
   for the computer to associate the image of the user's face with a water stream pressure setting, for the bidet, inputted by the user,
   for storing in the computer the water pressure setting associated to the image of the users face,
   (c) a facial recognition software programmed in the computer,
   for the computer to detect if the received image of the user's face is stored in the computer,
   for the detection of the image of the user's face in the computer, to activate the water pressure setting associated to the image of the user's face,
   (d) a user input device connected to the computer,
   for the user to view a display of a water pressure setting,
   for the user to input the displayed water pressure setting into the computer,
   (f) the bidet connected to the computer,
   for the computer to instruct the bidet with the activated water pressure setting,
   for the instruction to influence the water pressure of the bidet's water stream,
   (g) a toilet connected to the bidet,
   for the bidet to be positioned in the toilet,
   for the bidet to be positioned to direct a water stream at the user's posterior while they sit on the toilet,
   whereby when the user uses the toilet, the camera's imaging of the user's face, sets the bidet's water pressure to the water pressure setting previously inputted by the user.

2. The facial recognition bidet of claim 1, further including a plurality of displayed water pressure settings on the user input device and the displayed water pressure setting being input able to the computer,
   further including individually imaging a plurality of user's faces, with the camera connected to the computer,
   for associating each user's facial image with the water pressure setting inputted by each user,
   for storing each user's facial image associated with the water pressure setting in the computer,
   for the activating of the bidet water pressure setting associated to the user's facial image when the user's facial image is matched to the user's stored image,
   for the activated water pressure setting to instruct the computer,
   for the instructed computer to instruct the bidet to influence the water pressure of the bidet's water stream.

3. The facial recognition bidet of claim 1, wherein the computer comprises, a processor, a storage, and a software.

4. The facial recognition bidet of claim 1, wherein the user bidet water pressure settings input device is a mid-air touch free hand gesture input device,
   for the user to touch freely and sanitarily use mid-air hand gestures to input the bidet water pressure setting.

5. The facial recognition of claim 1, wherein the connection of the bidet, and the camera to the computer, is a local connection of the computer to the bidet, and the camera,
   for the computer to locally connect to the bidet, and camera.

6. The facial recognition bidet of claim 1, further including a radio frequency identification card, and a radio frequency identification card proximity card reader connected to the computer,
   for one water pressure settings to be stored on the radio frequency identification card,
   for a user to carry the radio frequency identification card,
   for the radio frequency identification card proximity reader to read the bidet water pressure setting programmed into the radio frequency identification card, when the radio frequency identification card is near the radio frequency identification card,
   for reading the bidet water pressure setting programmed into the radio frequency identification card,
   for the read bidet water pressure setting to be sent to the computer,
   the computer to instruct the bidet to influence the water pressure of the bidet's water stream with the received bidet water pressure setting,
   further including a radio proximity card input device,
   for inputting one water pressure setting into the radio proximity card.

7. The facial recognition bidet of claim 1, further including a software programmed into the computer,
   for replacing the stored bidet water pressure setting associated to the user's facial image, with the inputted bidet water pressure setting associated to the user's facial image,
   for the computer to detect if the user who inputted the bidet water pressure setting, has a bidet water pressure setting associated to the user's facial image stored in the storage,
   for the computer to replace the bidet water pressure setting in the storage associated to the image of the user's face, with the bidet water pressure setting inputted by the user.

8. A bidet configured to set a water pressure setting by identifying a user, comprising:

means for the user to input one of a plurality of water pressure settings, with a user water pressure setting input device connected to the computer and the user water pressure setting input device having a plurality of different water pressure settings and the plurality of different water pressure settings displayed on a display, means for the user to input the user's facial image into the computer with a camera connect to the computer, means for associating the users inputted facial image to the inputted water stream pressure setting, and means for storing in a storage the user's facial image associated to the water stream pressure setting, with the storage connected to the computer, means for imaging the user's face when the user is near the bidet with the camera, means for detecting if the image of the user's face is stored in the storage with a facial recognition software in the computer, means for activating the water stream pressure setting associated to the user's facial image when the user's facial image is detected in the storage, means for the activated water stream pressure setting to influence the pressure of a water stream of the bidet with the bidet connected to the computer, means for the bidet to be positioned inside a toilet and means for the water stream to be positioned to direct the water stream to the user's posterior and to direct the water stream to the user's posterior while the user sits on the toilet, whereby the bidet's water pressure setting is automatically set to the user inputted water pressure setting, when the user uses the bidet, without the user having to touch bidet input buttons which may be unsanitary, every time the user uses the bidet.

9. The bidet configured of claim 8, further including means for detecting the absence of the user's facial image in the storage, further including means for recording the bidet water stream pressure setting used by the detected absent user when the user uses the bidet, further including means for associating the image of the absent user's face with the bidet water stream pressure setting used by the absent user, further including means for storing the associated image of the absent user's face with the bidet water stream pressure setting used by the user in the storage.

10. The bidet configured of claim 8, further including means for individually imaging a plurality of users facial images and to associate each of the user's facial images to the water pressure setting inputted by each user and store the association in the storage.

11. The bidet configured of claim 8, wherein the connection of the camera, and the connection of the bidet to the computer, is an internet connection of the computer to the camera, and an internet connection of the computer to the bidet, for the computer to connect at a remote location on the internet to the bidet, and to the camera.

12. The bidet configured of claim 8, further including means for a user input able bidet water aeration setting to be displayed on the display, for the user to input the bidet water aeration setting into the computer, for the camera to image the user's face, for the computer to associate the user inputted bidet water aeration setting to the user's facial image, for the computer to store the associated user inputted bidet water aeration and user's facial image, for the bidet water aeration setting associated to the user's image, to be activated when the user's image is matched to the user's stored image, for the computer use the activated bidet water aeration setting to instruct the bidet to influence the water aeration of the bidet's water stream.

13. The bidet configured of claim 8, further including a user imputable bidet water temperature setting displayed on the display, for the user to input a bidet water temperature setting into the computer, for the camera to image the user's face, for the computer to associate the user inputted bidet water temperature setting to the imaged face of the user, for the computer to store the associated user inputted bidet water temperature setting and the imaged face of the user, for the bidet water temperature setting associated to the imaged face of the user, to be activated when the imaged face of the user is matched to the user's stored image, for the activated water temperature setting to influence the water temperature of the bidet's.

14. The bidet configured of claim 8, wherein the connection of the camera, and the bidet to the computer, is an internet connection of the computer to the camera, and the bidet.

15. A method for activating a bidet operating setting, which is associated to a user, when the user is recognized, comprising, inputting one of a plurality of different water pressure settings of the bidet into a computer with a user input device and the user input device displaying a plurality of different water pressure settings and the user input device connected to the computer, imaging a user's face with a camera connected to the computer and the camera positioned to image the user's face when the user is near the bidet, imputing the user's facial image into the computer with the camera connected to the computer, associating the users facial image to the inputted water stream pressure setting with a software in the computer, storing the user's facial image associated to the inputted water stream pressure setting in a storage with the storage connected to the computer, storing a plurality of users facial images and each user's facial image associated to the water pressure setting inputted by each user in the storage, searching for the user's facial image in the plurality of users facial images, detecting the image of the user's face in the plurality of user's facial images with a facial recognition software in the computer, activating the bidet's water stream pressure setting when the user's facial image is detected in the storage, influencing the bidet's water pressure stream with the activated water stream pressure setting with the bidet connected to the computer, positioning the bidet inside a toilet, streaming water from the bidet to the user's posterior and streaming the water to the user's posterior while the user sits on the toilet, whereby when the user uses the bidet, the bidet's water pressure setting is automatically set to the user's inputted water stream pressure setting, without the user having to touch possibly bacteria covered bidet input buttons, every time the user uses the bidet.

16. The method of claim 15, further detecting the absence of the user's facial image in the plurality of stored users facial images,
- further recording the water stream pressure setting used by the detected absent user when the user inputs one of the water pressure settings into the input device,
- further associating the image of the detected absent user's face with the recorded water stream pressure settings,
- further storing the associated image of the detected absent user's face with the recorded water stream pressure setting in the storage.

17. The method of claim 15, further providing an eye recognition software programmed into the computer,
- for the camera to image the user's eye,
- for the image the user's eye to be stored in the storage,
- for the stored image of the user's eye to be associated to one of the user inputted water pressure settings,
- for the user's eye image to be matched with the stored image of the user's eye,
- for the matching of the image of the user's eye to the stored image of the user's eye to activate the bidet water pressure setting associated to the stored image of the user's eye,
- for the computer to instruct the bidet to influence the water pressure of the bidet's water stream with the activated water pressure setting.

18. The method of claim 15, wherein the connection of the camera, and the connection of the bidet to the computer, is a network connection of the computer to the camera, and the bidet,
- for the computer to remotely connect to the bidet, and camera.

19. The method of claim 15, wherein the user input device is an eye gaze tracking input device,
- further providing a display connected to the computer,
  - for the user to use eye gaze to touch freely input one of the water pressure settings.

20. The method of claim 15, wherein the user input device is an eye gaze tracking input device,
- further providing a display connected to the computer,
  - for the user to use eye gaze to touch freely input one of the water pressure settings,
- further providing a user input able bidet water temperature setting displayed on the input device,
  - for the user to input a bidet water temperature setting into the computer,
- further providing a user imputable bidet water temperature setting displayed on the display,
  - for the user to input a bidet water temperature setting into the computer,
  - for the camera to image the user's face,
  - for the computer to associate the user inputted bidet water temperature setting to the imaged face of the user,
  - for the computer to store the associated user inputted bidet water temperature setting and the imaged face of the user,
  - for the bidet water temperature setting associated to the imaged face of the user, to be activated when the imaged face of the user is matched to the user's stored image,
  - for the activated water temperature setting to influence the water temperature of the bidet's,
- wherein the connection of the camera, and the bidet to the computer, is an internet connection of the computer to the camera, and the bidet.

* * * * *